United States Patent
Naim et al.

(10) Patent No.: US 9,591,624 B1
(45) Date of Patent: Mar. 7, 2017

(54) METHOD OF SCHEDULING COMMUNICATION IN A WIRELESS COMMUNICATION NETWORK

(71) Applicant: Sprint Spectrum LP, Overland Park, KS (US)

(72) Inventors: Muhammad Naim, Sterling, VA (US); Aik Chindapol, Washington, DC (US)

(73) Assignee: Sprint Spectrum L.P., Overland Park, KS (US)

( * ) Notice: Subject to any disclaimer, the term of this patent is extended or adjusted under 35 U.S.C. 154(b) by 323 days.

(21) Appl. No.: 14/209,938

(22) Filed: Mar. 13, 2014

(51) Int. Cl.
H04W 24/08 (2009.01)
H04W 72/04 (2009.01)

(52) U.S. Cl.
CPC .............................. H04W 72/0413 (2013.01)

(58) Field of Classification Search
CPC .................................................. H04W 72/0413
See application file for complete search history.

(56) References Cited

U.S. PATENT DOCUMENTS

| 8,310,961 | B2 | 11/2012 | Chindapol et al. | |
|---|---|---|---|---|
| 2011/0201341 | A1 | 8/2011 | Choudhury et al. | |
| 2012/0044922 | A1* | 2/2012 | Ishii | H04L 5/001 370/338 |
| 2012/0307780 | A1* | 12/2012 | Mochizuki | H04L 1/1812 370/329 |
| 2014/0204922 | A1* | 7/2014 | Kim | H04J 3/12 370/336 |

* cited by examiner

Primary Examiner — David Oveissi

(57) ABSTRACT

A system and method of scheduling communication in a wireless communication network are provided. An access node can receive an uplink scheduling request. The access node can communicate with a wireless device over a first and second frequency band. The access node can determine an interference indicator associated with the wireless device. The access node can determine a first scheduling scheme for the first frequency band and a second scheduling scheme for the second frequency band based on the uplink request and the interference indicator. The first scheduling scheme can comprise a first uplink portion and the second scheduling scheme can comprise a second uplink portion. The first uplink portion does not overlap the second uplink portion. The wireless device can be instructed to communicate uplink data to the access node during the first uplink portion and uplink data to the access node during the section uplink portion.

20 Claims, 6 Drawing Sheets

METHOD OF SCHEDULING COMMUNICATION IN A WIRELESS COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure thereby reducing the cost of building and maintaining network infrastructure. In addition, a wireless network can support added mobility by allowing a wireless device to access the network from various locations or addresses. A wireless interface can comprise at least one transceiver in active communication with another transceiver that is connected to the network.

Various types of channel access schemes can be used to communicate data over the wireless interface. For example, one type of channel access scheme uses frequency division. Frequency division can provide different frequency bands to different data streams. For example, on one frequency band, all time slots can be available for uplink transmissions and on another frequency band, all time slots can be available for downlink transmissions. In a time division channel access scheme, different time slots are available to different data streams over the same frequency band. Frequency division schemes can provide twice the bandwidth as time division schemes using the same power.

In a wireless network, resources required for uplink transmissions are generally different from resources required for downlink transmissions thus implementing a frequency division scheme can result in unused frequency resources which can undesirably impact transmission in the network. However, when wireless devices within a geographical location are assigned similar communication resources, interference can degrade the communications.

Overview

A system and method of scheduling communication in a wireless communication network are provided. An access node can receive an uplink scheduling request from a wireless device. The access node can communicate with the wireless device over a first frequency band and a second frequency band. The access node can determine an interference indicator associated with the wireless device. The access node can determine a first scheduling scheme for the first frequency band of the access node and a second scheduling scheme for the second frequency band of the access node based on the uplink request and the interference indicator. The first scheduling scheme can comprise a first uplink portion and the second scheduling scheme can comprise a second uplink portion wherein the first uplink portion does not overlap the second uplink portion. The wireless device can be instructed to communicate uplink data to the access node during the first uplink portion of the first scheduling scheme and to communicate uplink data to the access node during the section uplink portion of the second scheduling scheme.

BRIEF DESCRIPTION OF THE DRAWINGS

FIGS. 3 and 4 illustrate exemplary scheduling schemes for scheduling communication in a wireless communication network.

DETAILED DESCRIPTION

Figure 1:
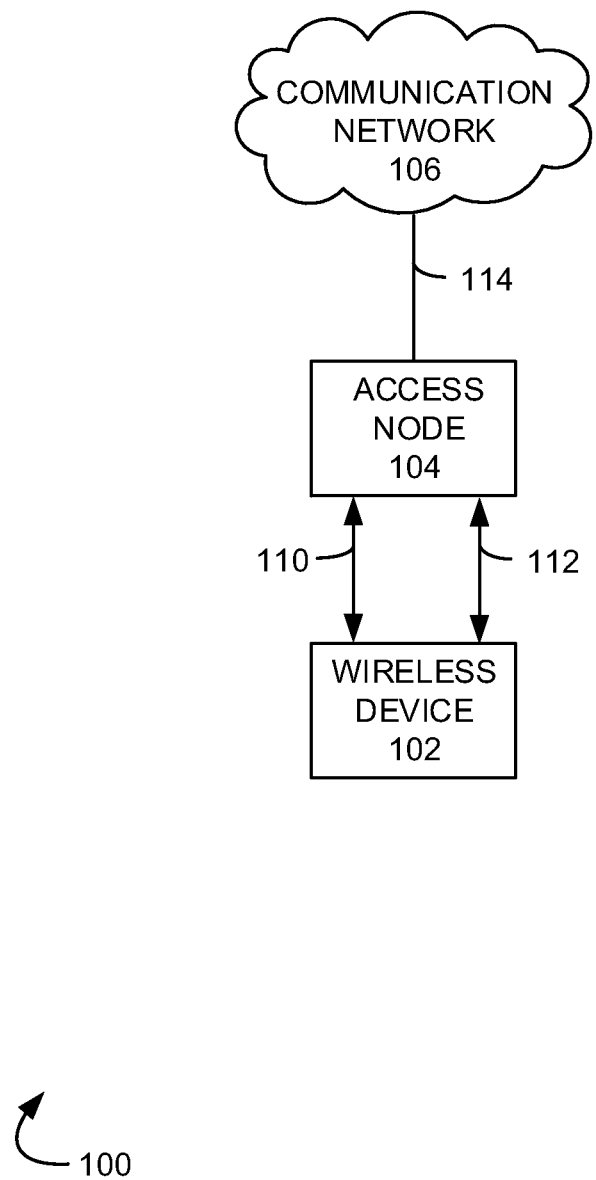
FIG. 1 illustrates a communication system to schedule communications in a wireless communication network.

FIG. 1 illustrates an exemplary communication system 100 for scheduling communication in a wireless communication network. Communication system 100 can comprise a wireless device 102, an access node 104 and a communication network 106. Other network elements may be present in the communication system 100 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access node 104 and communication network 106, which are omitted for clarity, including additional processing nodes, routers, gateways, and physical and/or wireless data links for carrying data among the various network elements.

Wireless device 102 can be any device configured to communicate over communication system 100 using a wireless interface. For example, wireless device 102 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented according to various exemplary embodiments disclosed herein.

The wireless interface of wireless device 102 can include one or more transceivers for transmitting and receiving data over communication system 100. Each transceiver can be associated with the same or different frequency bands, the same or different radio access technologies, the same or different network providers, and/or the same or different services. For example, wireless device 102 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 102 can be in communication with access node 104 through communication link 110 or through communication link 112. Links 110, 112 can use various communication media, such as air, space, metal, optical fiber, or some other signal propagation path—including combinations thereof. Communication links 110, 112 may comprise many different signals sharing the same link. Communication links 110, 112 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102 and access node 104 could share the same representative wireless link, but be transferred over different communication sessions, frequencies, timeslots, packets, ports, sockets, logical transport links, or in different directions—including combinations thereof. In an exemplary embodiment, communication link 110 can be associated with a first frequency band and communication link 112 can be associated with a second frequency band different from the first frequency band.

Wireless device 102 can transmit and/or receive information over system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access node 104 can be any network node configured to provide communication between wireless device 102 and communication network 106. Access node 104 can be a standard access nodes or a short range, low power access node. For example, access node 104 can be a macrocell access node such as a base transceiver station, a radio base station, an eNodeB device, or an enhanced eNodeB device, or the like or a short range access node such as a microcell access node, a picocell access node, a femtocell access node, or the like such as a home NodeB or a home eNodeB device. In an exemplary embodiment, access node 104 can be associated with at least two different frequency bands. For example, access node 104 can communicate with wireless device 102 over an 800 MHz frequency band, a 1.9 GHz frequency band, and/or a 2.5 GHz frequency band.

Access node 104 can comprise a processor and associated circuitry to execute or direct the execution of computer-readable instructions to obtain information. Access node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 104 can receive instructions and other input at a user interface.

Access node 104 can be in communication with communication network 106 through communication link 114. Communication link 114 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Link 114 can be a direct link or might include various equipment, intermediate components, systems, and networks.

Communication network 106 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 106 can be capable of carrying data, for example, to support voice, push-to-talk, broadcast video, and data communications by a wireless device such as wireless device 102. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 can also comprise additional base stations, controller nodes, telephony switches, internet routers, network gateways, computer systems, communication links, or some other type of communication equipment, and combinations thereof.

In operation, an access node such as access node 104 can receive an uplink scheduling request from a wireless device 102. Access node 104 can communicate with the wireless device 102 over a first frequency band 110 or a second frequency band 112. The access node 104 can determine an interference indicator associated with the wireless device 102. The access node 104 can determine a first scheduling scheme for the first frequency band and a second scheduling scheme for the second frequency band based on the uplink scheduling request and the interference indicator. The first scheduling scheme can comprise a first uplink portion and the second scheduling scheme can comprise a second uplink portion wherein the first uplink portion does not overlap the second uplink portion. The wireless device 102 can be instructed to communicate uplink data to access node 104 during the first uplink portion of the first scheduling scheme over the first frequency band and to communicate uplink data to the access node during the second uplink portion of the second scheduling scheme over the second frequency band.

Figure 2:
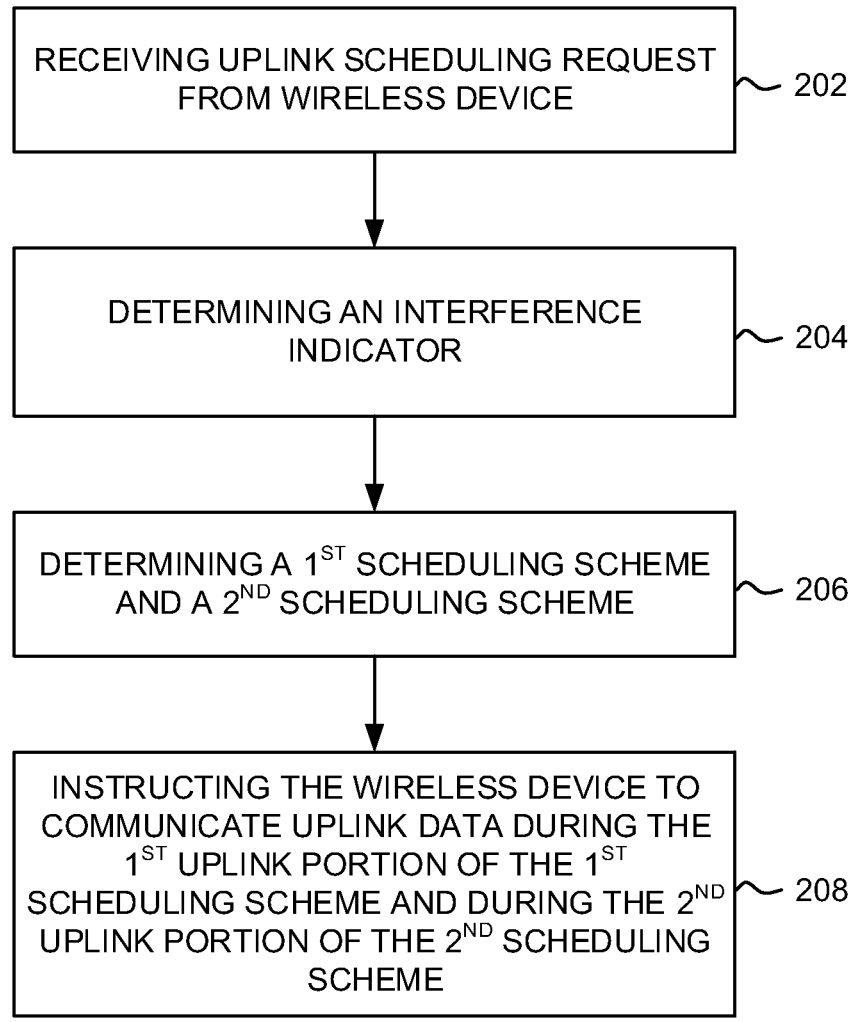
FIG. 2 illustrates an exemplary method of scheduling communication in a wireless communication network.

FIG. 2 illustrates a flow chart of an exemplary method of scheduling communication in a wireless communication network. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

At 202, an access node can receive an uplink scheduling request from a wireless device. For example, wireless device 102 can send an uplink scheduling request to access node 104 to request uplink resources. The uplink scheduling request can comprise an indication of a total amount of resources requested by wireless device 102, an indication of an application requirement of an application running on the wireless less device 102, an indication of a signal characteristic associated with the first frequency band of access node 104 detected at wireless device 102, an indication of a signal characteristic associated with the second frequency band of access node 104 detected at wireless device 102, an indication of mobility of wireless device 102, and a device characteristic of the wireless device.

The signal characteristics can be indicative of a signal quality and/or signal strength of each frequency band. For example, the signal characteristics can be at least one of received signal strength indication (RSSI), a throughput value of the access node, a signal-to-noise ratio (SNR) value, a carrier to noise ratio (CNR) value, a radio type value, energy per bit to noise power spectral density ratio, energy per symbol to noise power spectral density ratio, modulation error rate (MER), signal noise and distortion (SINAD), signal to interference (SII), signal to noise plus interference (SNIR), and signal to quantization noise ratio (SQNR). The device characteristics can be indicative of characteristics of the wireless device. For example, type and number of antennas, processing capabilities, storage capabilities, current storage usage, etc.

The access node can determine an interference indicator at 204. For example, access node 104 can determine an interference indicator associated with wireless device 102. The interference indicator can be based on at least one of a load on the access node, a location of other wireless devices in communication with the access node, an amount of resources requested by the other wireless devices in communication with access node 104, and a device characteristic of each other wireless device in communication. The more other wireless devices are within a predetermined area of wireless device 102 transmitting uplink data, the higher the interference indicator. The load on the access node can comprise a number of wireless devices in communication with the access node, an amount of storage and/or processing capabilities of the access node, amount of information transmitted and/or received by the access node, modulation and coding schemes used by the access node, types of applications running on wireless devices in communication with the access node, etc.

At 206, the access node can determine a first scheduling scheme and a second scheduling scheme. For example, access node 104 can determine a first scheduling scheme associated with the first frequency band 110 of access node 104 and a second scheduling scheme associated with the second frequency band 112 of access node 104. The first and second scheduling schemes can be based on the uplink scheduling request and the interference indicator. In addition, the first scheduling scheme can comprise a first uplink portion and the second scheduling scheme can comprise a second uplink portion where the first uplink portion does not overlap the second uplink portion. The first scheduling scheme can comprise a number of uplink portions different from a number of uplink portions associated with the second scheduling scheme. For example, the number of uplink portions associated with the first scheduling scheme can be greater than or less than the number of uplink portions associated with the second scheduling scheme.

In an exemplary embodiment, the first scheduling scheme can comprise at least one frame having a plurality of subframes such that at least one first uplink portion is associated with one subframe and at least one downlink portion is associated with one subframe. The second scheduling scheme can comprise at least one frame having a plurality of subframes such that at least one second uplink portion is associated with one subframe and at least one downlink portion is associated with one subframe and a number of first uplink portion subframes is greater than a number of second uplink portion subframes.

The wireless device can be instructed to communicate uplink data during the first uplink portion of the first scheduling scheme and during the second uplink portion of the second scheduling scheme at 208. For example, access node 104 can instruct wireless device 102 to communicate uplink data over the first frequency band during the first uplink portion of the first scheduling scheme and to communicate uplink data over the second frequency band during the second uplink portion of the second scheduling scheme. In an exemplary embodiment, wireless device 102 can be instructed to communicate uplink data during the first uplink portion using a first antenna and to communicate uplink data during the second uplink portion using a second antenna to minimize tuning delay associated with the antennas.

Figures 3, 4:
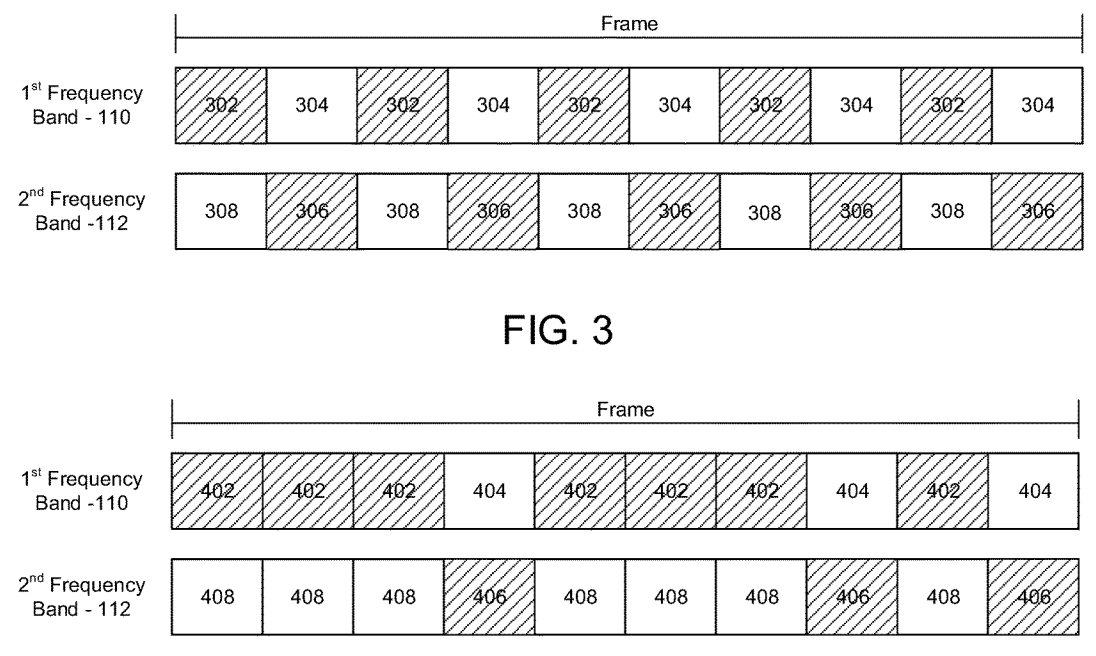

FIGS. 3 and 4 illustrate exemplary scheduling schemes for scheduling communication in a wireless communication network. In an exemplary embodiment, a scheduling scheme can comprise at least one frame having a plurality of subframes. As illustrated in FIGS. 3 and 4, one frame can comprise ten subframes, however a frame can comprise any number of subframes. A first scheduling scheme can be different from a second scheduling scheme where each scheduling scheme is associated with a different frequency band used to communicate between an access node and a wireless device. Each scheduling scheme can include at least one uplink portion to allow the wireless device to transmit data to the access node and at least one downlink portion to allow the wireless device to receive data from the access node.

As illustrated in FIG. 3, a first scheduling scheme associated with a first frequency band of access node 104 can comprise alternating uplink portions 302 and downlink portions 404. The second scheduling scheme associated with a second frequency band of access node 104 can also comprise alternating uplink portions 306 and downlink portions 308. The uplink portions 406 of the second scheduling scheme do not overlap the uplink portions 302 of the first scheduling scheme. Because the scheduling scheme associated with the first frequency band of access node 104 is different from the scheduling scheme associated with second frequency band of access node 104, wireless device 102 can continuously transmit uplink data using the uplink portions 302 and 306 by transmitting uplink data using different antennas for each frequency band.

FIG. 4 illustrates further exemplary scheduling scheme configurations. For example, a first scheduling scheme associated with the first frequency band of access node 104 can comprise adjacent uplink portions 402 and downlink portions 404. The second scheduling scheme associated with the second frequency band of access node 104 can comprise uplink portions 406 and adjacent downlink portions 408. While exemplary scheduling scheme configurations are illustrated in FIGS. 3 and 4, any scheduling scheme configuration can be used such that wireless device 102 can alternate uplink transmissions between the first frequency band of access node 104 and the second frequency band of access node 104 to create a continuous uplink transmission where the first scheduling scheme configuration is different from the second scheduling scheme configuration.

A number of uplink portions in each scheduling scheme can be different where the number of uplink portions is based on various factors. In an exemplary embodiment, the first frequency band can be associated with a higher frequency band and the second frequency band can be associated with a lower frequency band. A greater number of uplink portions can be scheduled in the first scheduling scheme when wireless device 102 is located closer to access node 104, has a lower mobility indication, has a high delay sensitive application running on the wireless device, and/or has requested a large amount of resources.

Figure 5:
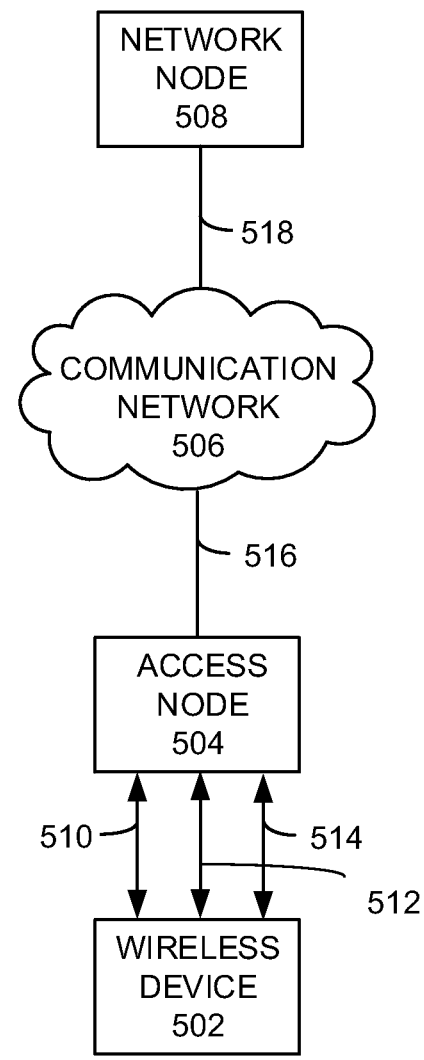
FIG. 5 illustrates another communication system to schedule communications in a wireless communication network.

FIG. 5 illustrates an exemplary communication system 500 for scheduling communication in a wireless communication network. Communication system 500 can comprise a wireless device 502, access node 504, communication network 506, and network node 508. Other network elements may be present in the communication system 500 to facilitate communication but are omitted for clarity, such as base stations, base station controllers, gateways, mobile switching centers, dispatch application processors, and location registers such as a home location register or visitor location register. Furthermore, other network elements may be present to facilitate communication, such as between access node 504 and communication network 506, which are omitted for clarity, including additional processing nodes, routers, gateways, and physical and/or wireless data links for carrying data among the various network elements.

Wireless device 502 can be any device configured to communicate over communication system 500 using a wireless interface. For example, wireless device 502 can include a remote terminal unit, a cell phone, a smart phone, a computing platform such as a laptop, palmtop, or a tablet, a personal digital assistant, or an internet access device, and combinations thereof. It is noted that while one wireless device is illustrated in FIG. 5 as being in communication with access node 504, any number of wireless devices can be implemented according to various exemplary embodiments disclosed herein.

The wireless interface of wireless device 502 can include one or more transceivers for transmitting and receiving data over communication system 500. Each transceiver can be associated with the same or different frequency bands, the same or different radio access technologies, the same or different network providers, and/or the same or different services. For example, wireless device 502 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), multimedia broadcast multicast service (MBMS), etc.

Wireless device 502 can be in communication with access node 504 through communication link 510, 512, or 514. Links 510, 512, 514 can use various communication media, such as air, space, metal, optical fiber, or some other signal propagation path—including combinations thereof. Communication links 510, 512, 514 may comprise many different signals sharing the same link. Communication links 510, 512, 514 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 502 and access node 504 could share the same representative wireless link, but be transferred over different communication sessions, frequencies, timeslots, packets, ports, sockets, logical transport links, or in different directions—including combinations thereof.

Wireless device 502 can transmit and/or receive information over system 500 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music, MP3's, ring tones, stock tickers, new alerts, etc.

Access node 504 can be any network node configured to provide communication between wireless device 502 and communication network 506. Access node 504 can be a standard access node or a short range, low power access node. For example, access node 504 can be a macrocell access node such as a base transceiver station, a radio base station, an eNodeB device, or an enhanced eNodeB device, or the like or a short range access node such as a microcell access node, a picocell access node, a femtocell access node, or the like such as a home NodeB or a home eNodeB device. In an exemplary embodiment, access node 504 can be associated with at least two different frequency bands. For example, access node 504 can communicate with wireless device 102 over an 800 MHz frequency band, a 1.9 GHz frequency band, and/or a 2.5 GHz frequency band.

Access node 504 can comprise a processor and associated circuitry to execute or direct the execution of computer-readable instructions to obtain information. Access node 504 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 504 can receive instructions and other input at a user interface.

Network node 508 can be any network node configured to receive uplink data from wireless device 502. Network node 502 can be a standalone computing device, computing system, or network component, and can be accessible, for example, by a wired or wireless connection, or through an indirect connection such as through a computer network or communication network. Alternatively, network node 508 can be integrated into any other network node in system 500. Network node 508 can be operated by the same network operator or different network operators. For example, network node 508 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, a serving gateway (SGW), a public data network gateway (PGW), a destination wireless device, etc.

Access node 504 can be in communication with communication network 506 through communication link 516. Network node 508 can be in communication with communication network 506 through communication link 518. Communication links 516, 518 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Links 516, 518 can be a direct link or might include various equipment, intermediate components, systems, and networks.

Communication network 506 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 506 can be capable of carrying data, for example, to support voice, push-to-talk, broadcast video, and data communications by a wireless device such as wireless device 502. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 506 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 506 can also comprise additional base stations, controller nodes, telephony switches, internet routers, network gateways, computer systems, communication links, or some other type of communication equipment, and combinations thereof.

In operation, an access node such as access node 504 can receive an uplink scheduling request from a wireless device 502 where the uplink scheduling request can comprise at least one of an indication of a total amount of resources requested by the wireless device, an indication of an application requirement of an application running on the wireless device, an indication of a signal characteristic associated with the first frequency band, an indication of a signal characteristic associated with the second frequency band, an indication of a signal characteristic associated with the third frequency band, an indication of mobility associated with the wireless device, and a device characteristic of the wireless device. Access node 504 can communicate with the wireless device 102 over a first frequency band 510, a second frequency band 512, or a third frequency band 514. The access node 504 can determine an interference indicator associated with the wireless device 502 where the interference indicator can be based on a load on the access node, a location of other wireless devices in communication with the access node, an amount of resources requested by the other wireless devices in communication with the access node, and a device characteristic of each of the other wireless devices in communication with the access node.

The access node 504 can determine a first scheduling scheme for the first frequency band, a second scheduling scheme for the second frequency band, and a third scheduling scheme for the third frequency band based on the uplink scheduling request and the interference indicator. The first scheduling scheme can comprise a first uplink portion, the second scheduling scheme can comprise a second uplink portion, and the third scheduling scheme can comprise a third uplink portion. The first uplink portion can be determined such that it does not overlap the second uplink portion and the third uplink portion can be determined such that it does not to overlap at least one of the first uplink portion and the second uplink portion. Wireless device 502 can be instructed to communicate uplink data to access node 504 during the first uplink portion of the first scheduling scheme over the first frequency band, to communicate uplink data to access node 504 during the second uplink portion of the second scheduling scheme over the second frequency band, and to communicate uplink data to access node 504 during the third uplink portion of the third scheduling scheme over the third frequency band. Access node 504 can receive the uplink data during the first uplink portion, the second uplink portion, and the third uplink portion and then combine all the uplink data before transmitting the combined data to network node 508. In an exemplary embodiment, wireless device 502 can be instructed to use a different antenna to transmit uplink data over each frequency band to reduce antenna tuning delay.

Figure 6:
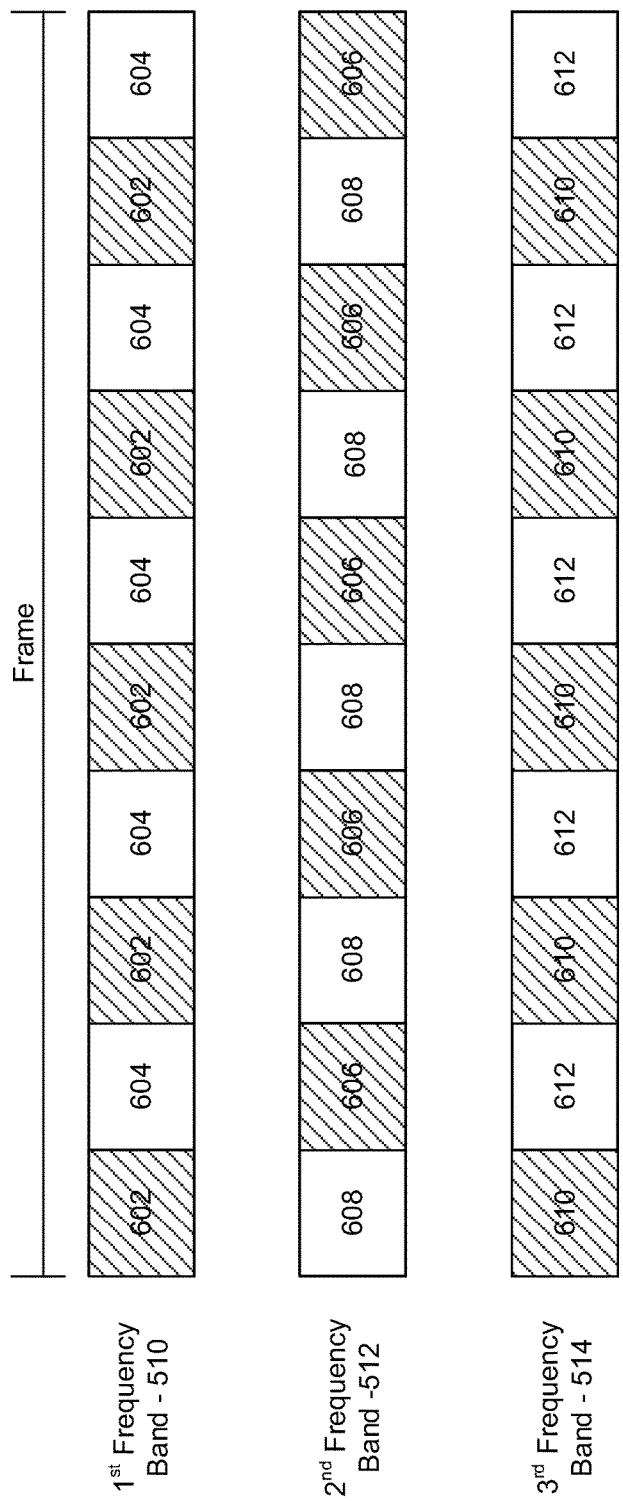
FIG. 6 illustrates another exemplary scheduling scheme for scheduling communication in a wireless communication network.

FIG. 6 illustrates an exemplary scheduling scheme for scheduling communication in a wireless communication network. In an exemplary embodiment, a scheduling scheme can comprise at least one frame having a plurality of subframes. As illustrated in FIG. 6, one frame can comprise ten subframes, however a frame can comprise any number of subframes. Each scheduling scheme can include at least one uplink portion to allow wireless device 502 to transmit uplink data to access node 504 using different frequency bands.

The first scheduling scheme associated with the first frequency band 510 of access node 504 can comprise alternating uplink portions 602 and downlink portions 604. The second scheduling scheme associated with the second frequency band 512 of access node 504 can comprise alternating uplink portions 606 and downlink portions 608. The third scheduling scheme associated with the third frequency band 514 of access node 504 can comprise alternating uplink portions 610 and downlink portions 612.

In an exemplary embodiment, wireless device 502 can be instructed to communicate over any of the uplink portions of any one of the frequency bands such that wireless device 502 continuously transmits uplink data. For example, wireless device 502 can be instructed to transmit during the first uplink portion 602 of the first scheduling scheme associated with the first frequency band then the first uplink portion 606 of the second scheduling scheme associated with the second frequency band then the second uplink portion 610 of the third scheduling scheme associated the third frequency band then the second uplink portion 606 of the second scheduling scheme associated with the second frequency band and so forth. However, wireless device 502 does not have to be instructed to change between the first frequency band, the second frequency band, and the third frequency band in any order. For example, using the scheduling schemes as illustrated in FIG. 6, wireless device 502 can be instructed to alternate between the first frequency band and the second frequency band for a predetermined duration and then alternate between the second frequency band and the third frequency band provided that the wireless device 502 is instructed to communicate with access node 504 using all three frequency bands during a predetermined period.

In addition, while the first scheduling scheme associated with the first frequency band is illustrated in FIG. 6 to be the same as the third scheduling scheme associated with the third frequency band for ease of illustration, the first scheduling scheme, the second scheduling scheme, and the third scheduling scheme can all be different from one another based on the uplink scheduling request and the interference indicator. The number of uplink portions associated with the first scheduling scheme can be different from the number of uplink portions associated with the second scheduling scheme and the number of uplink portions associated with the third scheduling scheme. For example, the number of uplink portions associated with the first scheduling scheme can be greater than the number of uplink portions associated with the second scheduling scheme and the number of uplink portions associated with the second scheduling scheme can be greater than the number of uplink portions associated with the third scheduling scheme or vice versa.

Figure 7:
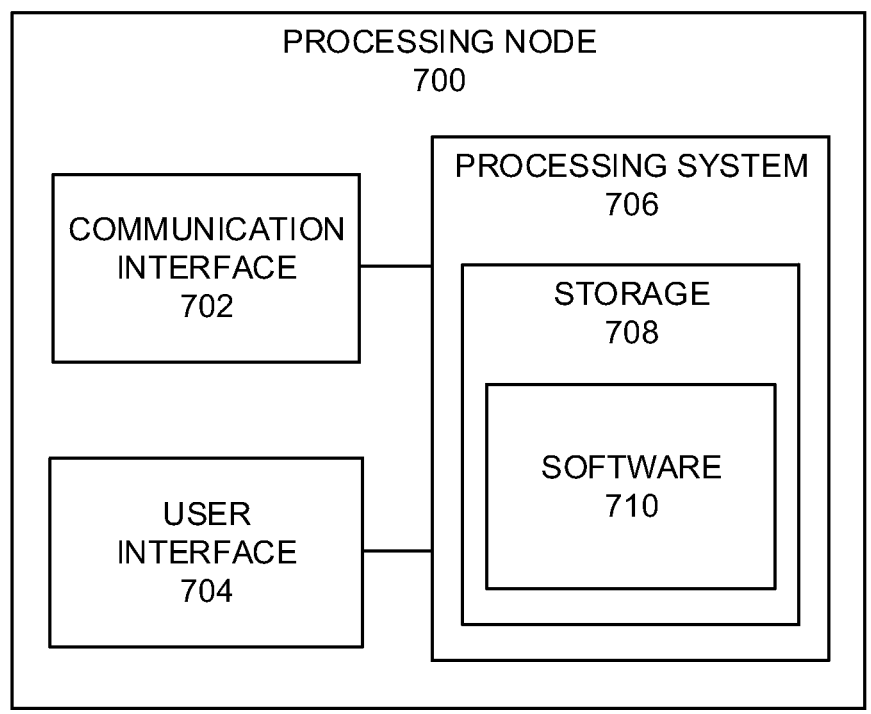
FIG. 7 illustrates a processing node according to an exemplary embodiment.

FIG. 7 illustrates an exemplary processing node 700 in a communication system. Processing node 700 comprises communication interface 702, user interface 704, and processing system 706 in communication with communication interface 702 and user interface 704. Processing node 700 is capable of monitoring communications in a communication network. Processing system 706 includes storage 708, which can comprise a disk drive, flash drive, memory circuitry, or other memory device. Storage 708 can store software 710 which is used in the operation of the processing node 700. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include access nodes 104, 504, and network node 508. Processing node 700 can also be an adjunct or component of a network element, such as an element of access nodes 104, 504, and network node 508. Processing node 700 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of scheduling communication in a wireless communication network, comprising:
   receiving at an access node an uplink scheduling request from a wireless device, wherein the access node communicates with the wireless device over a first frequency band and a second frequency band;
   determining at the access node an interference indicator associated with the wireless device;
   determining at the access node a first scheduling scheme for the first frequency band of the access node and a second scheduling scheme for the second frequency band of the access node based on the uplink scheduling request and the interference indicator, wherein the first scheduling scheme comprises a first number of uplink subframes within a first frame utilizing the first frequency band, and the second scheduling scheme comprises a second number of uplink subframes within a second frame utilizing the second frequency band, wherein the first number of uplink subframes does not overlap the second number of uplink subframes; and
   instructing the wireless device to continuously communicate uplink data to the access node during both the first number of uplink subframes of the first scheduling scheme and the second number of uplink subframes of the second scheduling scheme.

2. The method of claim 1, wherein the uplink scheduling request comprises at least one of an indication of a total amount of resources requested by the wireless device, an indication of an application requirement of an application running on the wireless device, an indication of a signal characteristic associated with the first frequency band, an indication of a signal characteristic associated with the second frequency band, an indication of mobility of the wireless device, and a device characteristic of the wireless device.

3. The method of claim 1, wherein the interference indicator is based on at least one of a load on the access node, a location of other wireless devices in communication with the access node, an amount of resources requested by the other wireless devices in communication with the access node, and a device characteristic of each other wireless device in communication with the access node.

4. The method of claim 3, wherein the device characteristic comprises at least one of processor information associated with the wireless device, a number of antennas, and an amount of storage available at the wireless device.

5. The method of claim 1, wherein the access node further communicates with the wireless device over a third frequency band and determining a third scheduling scheme for the third frequency band, wherein the third scheduling scheme comprises a third number of uplink subframes within a third frame utilizing the third frequency band, and the third number of uplink subframes does not overlap the first number of uplink subframes or the second number of uplink subframes.

6. The method of claim 1, wherein the first number of uplink subframes is greater than the second number of uplink subframes.

7. The method of claim 1, wherein the first scheduling scheme comprises at least one frame comprising a plurality of subframes such that at least one first uplink portion is associated with one subframe and at least one downlink portion is associated with one subframe.

8. The method of claim 7, wherein the second scheduling scheme comprises at least one frame comprising a plurality of subframes such that at least one second uplink portion is associated with one subframe and at least one downlink portion is associated with one subframe, and a number of first uplink portion subframes is greater than a number of second uplink portion subframes.

9. The method of claim 1, wherein the wireless device is instructed to communicate uplink data during the first number of uplink subframes using a first antenna and to communicate uplink data during the second number of uplink subframes using a second antenna.

10. The method of claim 1, further comprising:
receiving at the first access node the uplink data transmitted during the first number of uplink subframes and the uplink data transmitted during the second number of uplink subframes;
combining at the first access node the uplink data transmitted during the first number of uplink subframes and the second number of uplink subframes; and
transmitting from the access node the combined uplink data from the wireless device to a network node.

11. A system of scheduling communication in a wireless communication network, comprising:
a processing node configured to
receive an uplink scheduling request from a wireless device, wherein an access node communicates with the wireless device over a first frequency band and a second frequency band,
determine an interference indicator associated with the wireless device,
determine a first scheduling scheme for the first frequency band of the access node and a second scheduling scheme for the second frequency band of the access node based on the uplink scheduling request and the interference indicator, wherein the first scheduling scheme comprises a first number of uplink subframes within a first frame utilizing the first frequency band, and the second scheduling scheme comprises a second number of uplink subframes within a second frame utilizing the second frequency band, wherein the first number of uplink subframes does not overlap the second number of uplink subframes, and
instruct the wireless device to continuously communicate uplink data to the access node during both the first number of uplink subframes of the first scheduling scheme and the second number of uplink subframes of the second scheduling scheme.

12. The system of claim 11, wherein the uplink scheduling request comprises at least one of an indication of a total amount of resources requested by the wireless device, an indication of an application requirement of an application running on the wireless device, an indication of a signal characteristic associated with the first frequency band, an indication of a signal characteristic associated with the second frequency band, an indication of mobility of the wireless device, and a device characteristic of the wireless device.

13. The system of claim 11, wherein the interference indicator is based on at least one of a load on the access node, a location of other wireless devices in communication with the access node, an amount of resources requested by the other wireless devices in communication with the access node, and a device characteristic of each other wireless device in communication with the access node.

14. The system of claim 13, wherein the device characteristic comprises at least one of processor information associated with the wireless device, a number of antennas, and an amount of storage available at the wireless device.

15. The system of claim 11, wherein the access node further communicates with the wireless device over a third frequency band and the processing node is further configured to determine a third scheduling scheme for the third frequency band, wherein the third scheduling scheme comprises a third number of uplink subframes and the third number of uplink subframes does not overlap the first number of uplink subframes or the second number of uplink subframes.

16. The system of claim 11, wherein the first number of uplink subframes is greater than the second number of uplink subframes.

17. The system of claim 11, wherein the first scheduling scheme comprises at least one frame comprising a plurality of subframes such that at least one first uplink portion is associated with one subframe and at least one downlink portion is associated with one subframe.

18. The system of claim 17, wherein the second scheduling scheme comprises at least one frame comprising a plurality of subframes such that at least one second uplink portion is associated with one subframe and at least one downlink portion is associated with one subframe, and a number of first uplink portion subframes is greater than a number of second uplink portion subframes.

19. The system of claim 11, wherein the processing node is further configured to instruct the wireless device to communicate uplink data during the first number of uplink subframes using a first antenna and to communicate uplink data during the second number of uplink subframes using a second antenna.

20. The system of claim 11, wherein the processing node is further configured to
receive the uplink data transmitted during the first number of uplink subframes and the uplink data transmitted during the second number of uplink subframes,
combine the uplink data transmitted during the first number of uplink subframes and the second number of uplink subframes, and
transmit the combined uplink data from the wireless device to a network node.

* * * * *